(12) United States Patent
Spittle et al.

(10) Patent No.: US 11,236,471 B2
(45) Date of Patent: *Feb. 1, 2022

(54) ARTIFICIAL TURF FIELD SYSTEM

(71) Applicant: Profile Products LLC, Buffalo Grove, IL (US)

(72) Inventors: Kevin Scott Spittle, Vero Beach, FL (US); Joe E. Betulius, Naperville, IL (US)

(73) Assignee: PROFILE PRODUCTS LLC, Buffalo Grove, IL (US)

( * ) Notice: Subject to any disclaimer, the term of this patent is extended or adjusted under 35 U.S.C. 154(b) by 191 days.

This patent is subject to a terminal disclaimer.

(21) Appl. No.: 16/118,929

(22) Filed: Aug. 31, 2018

(65) Prior Publication Data

US 2018/0371708 A1 Dec. 27, 2018

Related U.S. Application Data

(63) Continuation of application No. 14/695,876, filed on Apr. 24, 2015, now Pat. No. 10,066,345.

(60) Provisional application No. 61/984,196, filed on Apr. 25, 2014.

(51) Int. Cl.
*E01C 13/08* (2006.01)
*D06N 7/00* (2006.01)

(52) U.S. Cl.
CPC ........... *E01C 13/08* (2013.01); *D06N 7/0063* (2013.01); *D06N 7/0071* (2013.01); *B32B 2264/107* (2013.01); *B32B 2264/402* (2020.08); *B32B 2264/403* (2020.08); *Y10T 428/23921* (2015.04); *Y10T 428/23993* (2015.04); *Y10T 428/2998* (2015.01)

(58) Field of Classification Search
CPC ............. E01C 13/08; Y10S 273/13; Y10T 428/23921; Y10T 428/23993; Y10T 428/2998; D10B 2505/202; B32B 2264/403; B32B 2264/107; B32B 2264/402; D06N 7/0063; D06N 7/0071
See application file for complete search history.

(56) References Cited

U.S. PATENT DOCUMENTS

| 4,735,825 A | 4/1988 | Friedrich |
| 5,041,320 A | 8/1991 | Meredith et al. |
| 5,188,175 A | 2/1993 | Sweet |

(Continued)

OTHER PUBLICATIONS

Canadian Office Action dated Mar. 22, 2021, Application No. 2,889,364, Applicant Profile Products L.L.C., 4 Pages.

(Continued)

*Primary Examiner* — Cheryl Juska
(74) *Attorney, Agent, or Firm* — Brooks Kushman P.C.

(57) ABSTRACT

An artificial turf field system is provided. The system may include a plurality of synthetic turf strands attached to a backing layer and an infill material positioned between the synthetic turf stands. The infill material may include a plurality of porous particles. A sub-layer may be included beneath the backing layer, and may be formed of a resilient material. A support layer may be included beneath the sub-layer, and may include materials configured for drainage. The porous particles of the infill material may include porous ceramic particles and the sub-layer may include rubber. The porous particles may be at least partially coated, for example, by a polymer coating. The infill material may be free of sand and/or crumb rubber.

15 Claims, 4 Drawing Sheets

(56) References Cited

U.S. PATENT DOCUMENTS

| | | |
|---|---|---|
| 6,155,749 A | 12/2000 | Tanner et al. |
| 6,221,445 B1 | 4/2001 | Jones |
| 6,358,312 B1 | 3/2002 | Tanner et al. |
| 6,527,889 B1 | 3/2003 | Paschal et al. |
| 6,818,274 B1 | 11/2004 | Buck et al. |
| 7,144,609 B2 | 12/2006 | Reddick |
| 7,752,804 B2 | 7/2010 | Spittle et al. |
| 8,256,158 B2 | 9/2012 | Spittle et al. |
| 8,256,159 B2 | 9/2012 | Spittle et al. |
| 8,555,544 B2 | 10/2013 | Spittle et al. |
| 8,795,834 B2 | 8/2014 | Tetrault et al. |
| 9,540,777 B1 | 1/2017 | Tetrault |
| 10,066,345 B2 | 9/2018 | Spittle et al. |
| 2002/0048676 A1 | 4/2002 | McDaniel et al. |
| 2003/0039773 A1 | 2/2003 | Paschal et al. |
| 2004/0040708 A1 | 3/2004 | Stephenson et al. |
| 2004/0214000 A1 | 10/2004 | Huff et al. |
| 2006/0117653 A1 | 6/2006 | Werth |
| 2006/0147670 A1 | 7/2006 | Reddick |
| 2007/0048343 A1 | 3/2007 | Merrill et al. |
| 2007/0160800 A1 | 7/2007 | Reddick |
| 2007/0237921 A1 | 10/2007 | Knapp et al. |
| 2008/0141516 A1 | 6/2008 | Julicher et al. |
| 2008/0145574 A1 | 6/2008 | Julicher et al. |
| 2008/0299331 A1 | 12/2008 | Gilardi et al. |
| 2009/0172970 A1 | 7/2009 | Preito et al. |
| 2009/0226646 A1 | 9/2009 | Dlubak et al. |
| 2012/0027962 A1 | 2/2012 | Huff et al. |
| 2012/0094107 A1 | 4/2012 | Spittle et al. |
| 2012/0258811 A1 | 10/2012 | Tetrault et al. |
| 2013/0199755 A1 | 8/2013 | Sawafta et al. |
| 2014/0322459 A1 | 10/2014 | Tetrault et al. |
| 2015/0259228 A1 | 9/2015 | Spittle et al. |
| 2016/0024376 A1 | 1/2016 | Fitzgerald et al. |

OTHER PUBLICATIONS

Canadian Office Action dated Oct. 8, 2021, Application No. 2,889,364, Owner Profile Products L.L.C, 3 Pages.

ARTIFICIAL TURF FIELD SYSTEM

CROSS-REFERENCE TO RELATED APPLICATIONS

This application is a continuation of U.S. application Ser. No. 14/695,876 filed Apr. 24, 2015, which claims the benefit of U.S. provisional application Ser. No. 61/984,196 filed Apr. 25, 2014, the disclosures of which are hereby incorporated in their entirety by reference herein.

TECHNICAL FIELD

The invention pertains to an artificial turf field system, for example, a system including a porous infill material.

BACKGROUND

Artificial turf fields have evolved from presenting tightly woven carpet-like surfaces to having long strands of synthetic fibers stitched onto a backing and an infill material is brushed into the fibers building up a layer over the backing. As the infill is brushed into the synthetic strands, the strands start to become vertical and look similar to natural grass. The synthetic strands and the backing are laid over gravel or other types of support material to allow drainage of the field after rains. Artificial turf fields are beneficial when excessive play or use is desired. Natural grass fields do not withstand sporting activities and overuse in inclement weather.

SUMMARY

In at least one embodiment, an artificial turf field system is provided. The system may include a plurality of synthetic turf strands attached to a backing layer and an infill material positioned between the synthetic turf stands. The infill material may include a plurality of porous particles. A sub-layer may be beneath the backing layer and may be formed of a resilient material. A support layer may be beneath the sub-layer.

In one embodiment, the porous particles include porous ceramic particles. In another embodiment, the infill material includes cork particles. The infill material may be substantially free of crumb rubber and sand. At least a portion of the porous particles may be at least partially covered in a coating, which may be a polymer coating. The polymer coating may include one or more of acrylic resin, Low Density Polyethylene (LDPE), High Density Polyethylene (HDPE), Polypropylene (PP), Polyvinyl Chloride (PVC), Polystyrene (PS), Nylon, nylon 6, nylon 6,6, Teflon (Polytetrafluoroethylene), Thermoplastic polyurethanes (TPU), acrylate monomers, Methacrylates, Methyl acrylate, Ethyl acrylate, 2-Chloroethyl vinyl ether, 2-Ethylhexyl acrylate, Hydroxyethyl methacrylate, Butyl acrylate, Butyl methacrylate, trimethylolpropane triacrylate (TMPTA), Polymethyl acrylate, polymethyl methacrylate, alkyl acrylate copolymer (ACM) or combinations thereof.

The plurality of porous particles may hold water in a ratio of particle weight to water weight of 1:0.5 to 1:1.5. In one embodiment, the plurality of porous particles has a porosity of no less than 30 volume percent. The plurality of porous particles may have an average pore size of 0.5 to 18 microns. The sub-layer may include rubber and may have a thickness of 0.01 to 8 inches. The support layer may include crushed stone, concrete, soil, gravel, stone, asphalt, smoothed sand, compacted soil, fiber reinforced soil, glass, ceramics, or combinations thereof.

In at least one embodiment, an artificial turf field system is provided. The system may include a plurality of synthetic turf strands attached to a backing layer and an infill material positioned between the synthetic turf stands. The infill material may consist essentially of a plurality of porous particles. At least a portion of the porous particles may have a polymer coating thereon.

In one embodiment, the system may further include a sub-layer beneath the backing layer, the sub-layer formed of a resilient material, and a support layer beneath the sub-layer. The polymer coating may cover an average of 5 to 50 percent of the outer surfaces of the porous particles. In one embodiment, at least 95% of the porous particles pass through a size 10 sieve and at least 95% of the porous particles are retained on a size 20 sieve.

In at least one embodiment, an artificial turf field system is provided. The system may include a plurality of synthetic turf strands attached to a backing layer and an infill material positioned between the synthetic turf stands. The infill material may include a plurality of porous ceramic particles. A sub-layer may be beneath the backing layer and may be formed of a resilient material.

In one embodiment, the plurality of porous particles hold water in a ratio of particle weight to water weight of 1:0.5 to 1:1.5. The sub-layer may include rubber and may have a thickness of 0.01 to 8 inches. The porous particles may have a porosity of no less than 30 volume percent.

DETAILED DESCRIPTION

Figure 1:
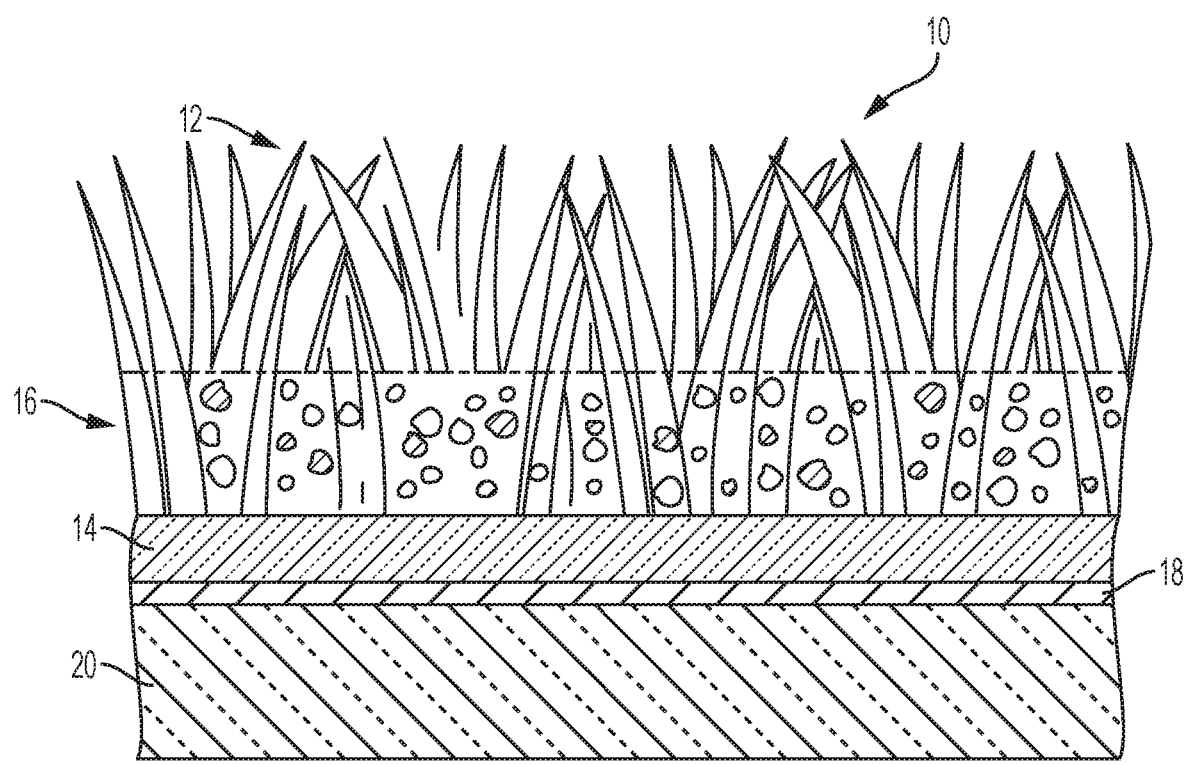
FIG. 1 is a schematic cross-section of an artificial turf system, according to an embodiment.

Reference will now be made in detail to compositions, embodiments, and methods of the present invention known to the inventors. However, it should be understood that disclosed embodiments are merely exemplary of the present invention which may be embodied in various and alternative forms. Therefore, specific details disclosed herein are not to be interpreted as limiting, rather merely as representative bases for teaching one skilled in the art to variously employ the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in this description indicating amounts of material or conditions of reaction and/or use are to be understood as modified by the word "about" in describing the broadest scope of the present invention.

The description of a group or class of materials as suitable for a given purpose in connection with one or more embodiments of the present invention implies that mixtures of any two or more of the members of the group or class are suitable. Description of constituents in chemical terms refers to the constituents at the time of addition to any combination specified in the description, and does not necessarily preclude chemical interactions among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same technique as previously or later referenced for the same property.

The following terms or phrases used herein have the exemplary meanings listed below in connection with at least one embodiment:

"Particles" as used herein may refer to: (i) ceramic particles; and/or, (ii) inorganic non-ceramic particles which may include one or more types of porous particles such as smectite clay, perlite, sand, vermiculite, zeolite, Fuller's earth, diatomaceous earth, shale, and combinations thereof.

"Capillary porosity" as used herein refers to: water holding pore space which holds water against the force of gravity and permits the slow release of water back to the soil or surrounding environment as it dries out.

"Non-capillary porosity" as used herein refers to: air pore space that will hold water during an irrigation or rain event, but will drain by gravity. After the particles drain, the non-capillary pores will contain air, while the capillary pores will retain water in them. With both the capillary and non-capillary porosity, the porous particles have a relatively large surface area.

The disclosure of the following references are hereby incorporated in their entirety by reference herein: ASTM D471-12a Standard Test Method for Rubber Property—Effect of Liquids; ASTM D5886-95; ASTM. F-1292 Standard Specification for Impact Attenuation of Surface Systems Under and Around Playground Equipment; ASTM D624: Standard Test Method for Tear Strength of Conventional Vulcanized Rubber and Thermoplastic Elastomers; ASTM F1551-03: Standard Test Methods for Comprehensive Characterization of Synthetic Turf Playing Surfaces and Materials: Suffix-DIN 18-035, Part 6: Water Permeability of Synthetic Turf Systems and Permeable Bases; ASTM D412: Standard Test Methods for Vulcanized Rubber and Thermoplastic Elastomers; ASTM C1028, Standard Test Method for Determining the Static Coefficient of Friction of Ceramic Tile and Other Like Surfaces by the Horizontal Dynamometer Pull Meter Method; Ceramic Fabrication Technology By Roy W. Rice (ISBN: 0824708539); Polymers in Industry from A to Z: A Concise Encyclopedia by Leno Mascia (ISBN: 3527329641); Ceramics and Composites Processing Methods, Narottam P. Bansal (Editor), Aldo R. Boccaccini (Editor) (ISBN: 0470553448); and ASTM D 2859, Standard Test Method for Flammability of Finished Textile Floor Covering Materials as directed in Federal Document DOC FF 1-70.

As described in the Background, current artificial turf systems generally include long strands of synthetic fibers stitched onto a backing, which may be a carpet-like material. An infill material is typically brushed into the fibers to build up a layer over the backing. The infill is typically formed of crumb rubber (e.g., granulated used tires) or a combination of crumb rubber and sand. As the infill is brushed into the synthetic strands, the strands straighten and become vertical, thereby resembling natural grass. The synthetic strands, infill, and backing are typically laid over gravel or another type of support material to allow drainage of the field after rains.

The current artificial turf systems have advantages over the original tightly woven carpet-like surfaces with short fiber-lengths (commonly referred to as AstroTurf®), such as a more natural appearance and performance. Current artificial turf systems have come under increased scrutiny, however, due to concerns over increased injury risks and health issues. For example, artificial turf systems including crumb rubber have been linked to increased lower-body injuries and elevated risks of cancer. In addition, artificial turf systems including crumb rubber get extremely hot during times of high temperatures, which can be dangerous and/or uncomfortable for athletes. Accordingly, improvements in artificial turf systems are needed to provide a safer and more enjoyable experience for athletes, while maintaining the advantages provided by artificial turf systems, such as low wear, use in inclement weather, and reduced maintenance.

With reference to FIG. 1, an embodiment of an artificial turf system 10 is provided. The system 10 may include a number of synthetic turf strands 12 supported on a backing layer 14. An infill material 16 may be disposed among the synthetic turf strands 12. The backing layer 14 may be disposed over a sub-layer 18, which may in turn be disposed over a support layer 20.

The synthetic turf strands 12 may be formed of any suitable synthetic material, such as polyethylene or nylon materials. The synthetic turf strands 12 may be attached to the backing layer 14 in any suitable manner. For example, the strands 12 may be stitched to the backing layer 14 or attached using an adhesive or fasteners. Many different factors are involved in selecting the strands 12 in synthetic turf systems. These factors may include: ball/surface interaction (vertical ball rebound, ball roll, etc.), player/surface interaction (such as deformation, slip resistance, traction, etc.), and also shock absorption and energy restitution. The synthetic turf fibers 12 may have a resemblance to natural grass and, for example, be of a green color; such as a unicolor or a mixed shade of green and other colors. However, the fibers 12 may have any color to provide a desired aesthetic or match another material. For example, if the system 10 is used in a baseball field, a portion of the fibers may be brown to resemble a skinned infield.

The synthetic turf fibers 12 may be formed of bundles of monofilament extruded fibers with a geometry that ensures autonomous resilient behavior of the turf fibers. The synthetic turf fibers 12 may be formed from polyethylene because of its relative softness and the low coefficient of friction of its surface. Decitex, abbreviated dtex, is a property of the fibers, defined as the mass in grams per 10,000 meters. When measuring objects that consist of multiple fibers the term "filament tex" is sometimes used, referring to the mass in grams per 1000 meters of a single filament. Expressed in another way, dtex is a unit of the linear density of a continuous filament, equal to ⅒th of a tex or %0th of a denier. The diameter of a filament can be calculated using tex with the following formula:

$$\text{Diameter} = \sqrt{\frac{Tex}{1000 \cdot \text{density} \cdot 0.7855}}$$

where density is in grams per cubic centimeter and the diameter is in mm.

The synthetic turf fibers 12 may have a dtex between 6,000 and 16,000, or any sub-range therein. For example, the fibers 12 may have a dtex between 8,000 and 16,000. In one embodiment, the fibers 12 may be formed of bundles of individual monofilaments, which may individually have a dtex of, for example, 500 to 2,500. In another embodiment, single turf fibers with the same weight (fibrillated tapes) or bundles of slit tapes (so-called mono-tapes) with the same dtex could be used. Different shapes of grass fibers may be bundled, and combinations of monofilaments with fibrillated and/or mono-slit tape artificial grass fibers may also be used.

In one embodiment, the synthetic turf fibers 12 may have a thickness of at least about 80 microns and a width of 1 to 10 millimeters. For example, the fibers 12 may have a width of between 1 and 8 mm, 1 and 5 mm, 1 and 3 mm, or 1 and 2 mm. In one embodiment, the fiber thickness is between 1.3 and 2.0 mm.

In one embodiment, the turf fibers 12 may include two or more types of fibers, such as base fibers and grass fibers. The base fibers may form a part of the backing layer 14 or may be shorter fibers extending from the backing layer 14. The grass fibers may be the fibers that extend above the infill material 16 and are seen by the athletes. The base layer fibers may have a solid or monolithic cross-section, not made up from a bundle of filaments, which may be used for the grass fibers, but may be a thick, monofilament. The base layer synthetic turf fibers may be relatively thick, at least significantly thicker than the grass fibers, in one embodiment. The base layer fibers may also have a greater stiffness than the grass fibers, such as a greater bending stiffness. The synthetic turf fibers 12 (base and/or grass fibers) may be made of polyethylene, polypropylene, nylon or a combination of filaments from different materials and/or filament containing multiple materials. The synthetic turf fibers could be fibrillated or mono-filaments. In one embodiment, the synthetic turf fibers are straight, but a curled design is also possible.

The artificial turf system 10 may include a density of fibers 12 per square inch that replicates or approximates the feel, look, and aesthetics of real grass. In one embodiment, the number of fibers per square inch may be from 10-100. The synthetic turf fibers 12 may have a length such that they extend above or beyond the infill material 16. The fibers 12 may extend beyond the infill material 16 by a predetermined distance. In one embodiment, the fibers 12 may extend above the infill material 16 by at least about 5 mm. For example, the fibers 12 may extend beyond the infill material 16 by at least 10, 15, 20, or 25 millimeters, and may be within a range of 3-50 mm, 5-30 mm, 10-25 mm, or 15-20 mm.

Figure 2:
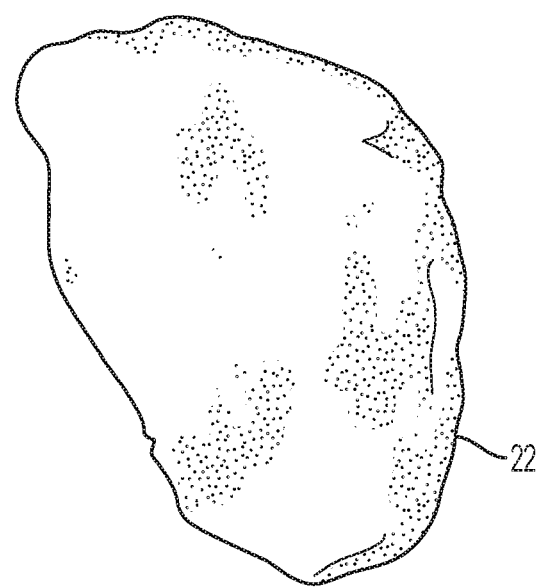
FIG. 2 is an image of a porous particle used in an artificial turf infill material, according to an embodiment.
Figure 3:
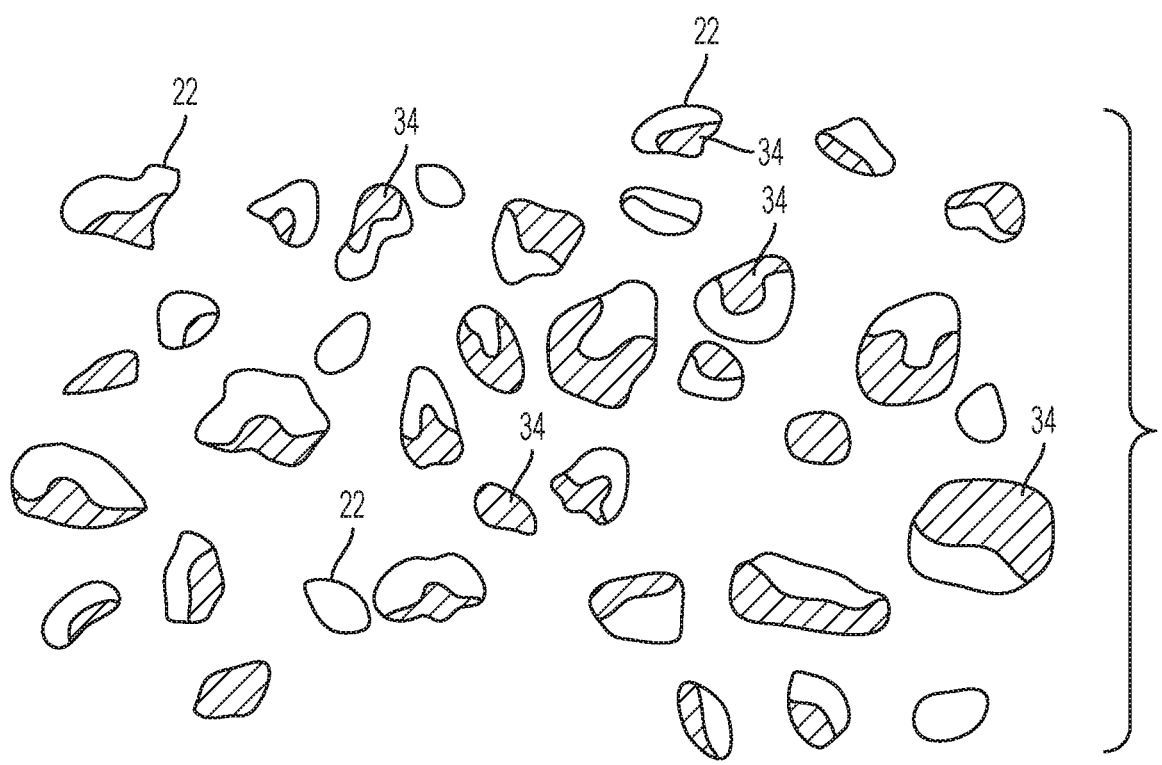
FIG. 3 is an image of porous particles having varying thicknesses of a polymer coating applied thereon, which may be used in used in an artificial turf infill material, according to an embodiment.

With reference to FIGS. 2-3, an infill material 16 for the system 10 is shown. The infill material 16 may be placed onto the backing layer and into spaces between the stands 12. The infill material 16 may be raked into the turf surface to support the synthetic turf strands 12 to a depth that will support the strands. The depth "D" of the infill may be dependent on the tightness of the strand weave, the length of the strands, the type of the strands, the intended field use, or other factors. The infill material 16 may affect the shock absorption of the field, as well as the speed and bounce of a ball used thereon.

Current artificial turf systems typically include an infill material of crumb rubber or a mixture of crumb rubber and sand. In these systems, the infill material provides several functions. As described above, it may support the synthetic turf fibers such that they extend vertically upward to resemble real grass. In addition, the infill material provides a cushioning function by absorbing energy (e.g., through deformation or compression) from impacts on the field from, for example, running, falling, or colliding with the field. By absorbing some of the energy from the impact, the current systems were intended to reduce the number and/or degree of sports-related injuries, such as head injuries from impacts of the head on the field.

However, the crumb rubber-based infill material of the current systems has several significant drawbacks. First, it has been suggested that the direct contact with the rubber infill material may result in an increased risk of cancer in athletes. The cancer risk may be from breathing the fumes of or ingesting the crumb rubber. The exact mechanism or cause of the increased risk has not been determined. In addition, the risk of blood-related cancers, such as Lymphoma and Leukemia, may be increased due to contact of the open wounds on the athletes with the crumb rubber. There may also be health risks associated with high levels of lead associated with the crumb rubber component. In one example, soccer goalies may unintentionally ingest some of the crumb rubber particles while playing on the turf systems, which may have a carcinogenic effect.

Second, while the energy absorption of the crumb rubber may be beneficial for certain impact injuries, such as head injuries, it has been found that it may increase the risk of other types of injuries. For example, injuries cause by change-of-direction movements may be increased by the crumb rubber infill material. Lower soft tissue injures often result when the foot is planted on the surface. The crumb rubber infill of current systems increases the contact time of the foot on the surface while running or cutting, which may result in increased lower soft tissue injuries. Third, current artificial turf systems get extremely hot in warm weather, compared to natural turf fields. The crumb rubber and synthetic turf strands may trap the heat close to the field surface, increasing the temperature by 30-50 degrees above ambient air temperature, or more.

The disclosed infill material 16 addresses each of these issues to provide a safer and more comfortable playing experience for athletes. In at least one embodiment, the infill material 16 includes a porous material, such as porous particles. As described above, the particles may include ceramic particles and/or inorganic non-ceramic particles, such as smectite clay, perlite, sand, vermiculite, zeolite, Fuller's earth, diatomaceous earth, shale, and combinations thereof. In one embodiment, the infill material 16 consists essentially of the porous material. In another embodiment, the infill material 16 consists entirely of the porous material. Due, at least in part, to being porous, the infill material 16 may have a different bulk density relative to conventional infill materials (e.g., rubber or rubber/sand).

In one embodiment, the infill material 16 may have a bulk density of no greater than 50, 60, 70, 80, or 90 pounds per cubic foot (lb/ft$^3$). In another embodiment, the porous material may have a bulk density of 15 to 75 lb/ft$^3$, 15 to 65 lb/ft$^3$, 20 to 60 lb/ft$^3$, 25 to 55 lb/ft$^3$, 30 to 65 lb/ft$^3$, 30 to 50 lb/ft$^3$, 30 to 45 lb/ft$^3$, 35 to 50 lb/ft$^3$, or 35 to 40 lb/ft$^3$. The infill material 16 may therefore have a bulk density that is significantly lower than typical stone products, such as natural stone nuggets, volcanic stone particles, and sand materials. By way of example, sand is known to have a bulk density of 90 lb/ft$^3$, or more, even greater than 105lb/ft$^3$. In addition, the infill material 16 may be more dense than crumb rubber, which typically has a bulk density of 20 to 30 lb/ft$^3$. Accordingly, the infill material 16 may have a bulk density that lies between the current infill materials. In contrast to current infill materials, the infill material 16 may have a uniform or substantially uniform density. In systems using a sand/crumb rubber combination, the differences in the two densities (sand density significantly higher than crumb rubber) result in a sifting or migration of the denser sand particles to the bottom and the less dense crumb rubber to the top. Once this separation occurs, it is virtually impossible to fix without removing the entire infill. In embodiments where the infill material 16 has a uniform density, little or no migration or separation will occur.

In at least one embodiment, the infill material 16 comprises porous ceramic particles. FIG. 2 depicts an example of a porous ceramic particle that may be used in the infill material 16 of the system 10. Suitable porous ceramic particles may include those commercially available as Profile Porous Ceramic particles by Profile Products, LLC of Buffalo Grove, Ill. Suitable calcined particles are disclosed in Tanner et al., U.S. Pat. No. 6,358,312 entitled "Sports Field Soil Conditioner," the disclosure of which is hereby incorporated in its entirety by reference herein. These porous ceramic particles are clay-based montmorillonite particles. In certain instances, the porous particles are a combination of clay components that have been kiln heated or calcined to change the clay to a ceramic mineral state. Without being limited to any particular theory, it is believed that during the calcining process, dehydration of the clay minerals occurs, and the mineral particles coalesce, agglomerate, and densify. Crystal grain growth may occur. The calcined product is cooled slowly, then broken up into generally angular particles or granulates. The monmorillonite particle may be fired to high temperatures such as 1300° F., or higher to make a porous ceramic particle. In one embodiment, the porous ceramic particles are constituted of the following elements, 42% illite±15% by dry weight, 39% quartz±15% by dry weight, and 19% opal±15% by dry weight as determined by X-ray diffraction (e.g., 27-57% illite, 24-54% quarty, and 4-34% opal). In certain instances, the porous particles may further be processed to vary in size distribution. The porous particles may be further be de-dusted, for example, by pneumatically de-dusting.

The porous ceramic particles may differ from the inorganic non-ceramic particles, which may be used in the infill material 16 in some embodiments. For example, the porous ceramic particles may have a higher hardness than, for example, perlite, zeolite, and diatomaceous earth.

Particles are 3-dimensional objects, and unless they are perfect spheres (e.g. emulsions or bubbles), they may not be fully described by a single dimension such as a radius or diameter. In order to simplify the measurement process, it is often convenient to define the particle size using the concept of equivalent spheres. In this case the particle size is defined by the diameter of an equivalent sphere having the same property as the actual particle such as volume or mass for example. It is important to realize that different measurement techniques use different equivalent sphere models and therefore will not necessarily give exactly the same result for the particle diameter. Examples of equivalent spheres measurements include: sphere of the same maximum length; sphere of same minimum length; sphere of same weight; sphere having same sedimentation rate; sphere passing same sieve aperture; sphere of same volume; and, sphere of same surface area. For sake of clarity, particles will be described using the general concept as sphere of same sieve size.

In one or more embodiments, the porous particles may be identified by a mesh screen size or a weight percentage of the porous particles retained by a size mesh. First, with regard to the mesh screen size, the standard used herein is the Tyler mesh size (i.e., mesh sizes herein are Tyler mesh sizes, unless otherwise indicated). Tyler mesh size is the number of openings per (linear) inch of mesh. The porous particles are sometimes described as having a certain mesh size (e.g. 5 mesh particles). The particles may be referred to a size range from the percentage of particles that pass through a mesh screen and the percentage of particles that are retained on a mesh screen. This particular designation will indicate that a particle will pass through some specific mesh (that is, have a maximum size; larger pieces won't fit through this mesh) but will be retained by some specific tighter mesh (that is, a minimum size; pieces smaller than this will have passed through the mesh). This type of description establishes a range of particle sizes. For example, "5×30" may refer to a set of particles in which no less than 95 percent of the particles pass through a number #5 sieve and no less than 95 percent of the particles are retained on a number #30 sieve.

The porous particles may have a size designated as a Tyler mesh range, a fixed millimeter size, or a weight percent of the number of porous particles retainable by a mesh size. The porous particles may have a mean particle size in the range of, for example, 0.05 mm to 2.5 mm, 0.1 mm to 1 mm, or 0.1 mm to 0.5 mm. In another embodiment, the porous particles may have an average size range of 290 to 2,000 µm. In another embodiment, the porous particles may have an average size that corresponds to find, medium, coarse, or very coarse sand (see, e.g., Table 3). Additional embodiments of the porous particle sizes are described below in Table 1, in which the left column describes a screen or sieve size that at least 95 weight percent of the particles will pass through and the right column described a screen or sieve size that at least 95 weight percent of the particles will be retained on. For example, the porous particles may pass no less than 95 percent on a number #5 sieve and retain no less than 95 percent on a number #30 sieve. These particles are may be termed "5×30" particles. In another example, the porous particles may pass no less than 95 percent on a number #24 sieve and retain no less than 95 percent on a number #48 sieve (e.g., 95%<841 microns and 95%>297 microns). These particles may be termed "24×48" particles. Similarly, if the porous particles pass no less than 95 percent on a number #10 sieve and retain no less than 95 percent on a number #20 sieve, these particles may be termed "10×20" particles (e.g., 95%<2,000 microns and 95%>841 microns). If the porous particle pass no less than 95 percent on a number ½" sieve and retain no less than 95 percent on a number #6 sieve, these particles may be termed "½"×6 particles.

TABLE 1

| 95 wt. % will pass through: | 95 wt. % will be retained on: |
|---|---|
| 12,700 micron screen | 51 micron screen |
| 10,000 micron screen | 150 micron screen |
| 7,500 micron screen | 200 micron screen |
| 4,000 micron screen | 51 micron screen |
| 2,000 micron screen | 51 micron screen |
| 20,000 micron screen | 20 micron screen |
| 15,000 micron screen | 20 micron screen |
| 10,000 micron screen | 20 micron screen |
| 5,000 micron screen | 20 micron screen |
| 2,000 micron screen | 20 micron screen |
| 20,000 micron screen | 75 micron screen |
| 20,000 micron screen | 150 micron screen |
| #5 sieve | #30 sieve |
| #24 sieve | #48 sieve |
| #10 sieve | #20 sieve |
| 0.5 inch sieve | #6 sieve |

Non-limiting examples for the 5×30, 10×20, 24×48, and ½"×6 porous particles include porous ceramic particles under the trade name of "Pro League," "Field and Fairway," and "Greens Grade," respectively, available from Profile Products, LLC of Buffalo Grove, Ill. Non-limiting particle distribution values for these particles are tabulated in Table 2 below.

TABLE 2

| | Percentages of particles collected on sieves in millimeters (mm) | | | | | |
|---|---|---|---|---|---|---|
| | 10 mesh sieve (2 mm) | 18 mesh sieve (1 mm) | 35 mesh sieve (0.5 mm) | 60 mesh sieve (0.25 mm) | 100 mesh sieve (0.15 mm) | 270 mesh sieve (0.05 mm) |
| Pro League | 18-24 | 67-73 | 5.0-7.0 | 0.2-0.6 | 0.1-0.3 | 0.05-0.2 |
| Field & Fairway 10 × 50 | less than 0.5 | 32-38 | 41-47 | 17-23 | 0.05-0.2 | 0.05-0.2 |
| Greens Grade 24 × 48 | less than 0.5 | 0.05-0.2 | 52-67 | 37-44 | 0.05-0.4 | 0.05-0.4 |

The size of the porous particles may also be expressed as the weight percent of the number of porous particles retainable by a mesh size. In certain instances, the number of porous particles have at least one of the following size ranges: 1 to 20 weight percent of the number of porous particles retainable by a size 8 mesh, 70 to 90 weight percent of the number of porous particles retainable by a size 16 mesh, and 5 to 20 weight percent of the number of porous particles retainable by a size 20 mesh. In certain other instances, the number of porous particles have at least one of the following size ranges: 5 to 15 weight percent of the number of porous particles retainable by a size 8 mesh, 75 to 85 weight percent of the number of porous particles retainable by a size 16 mesh, and 10 to 15 weight percent of the number of porous particles retainable by a size 20 mesh. In one or more embodiments, a size 8 mesh may have an average sieve diameter of about 2.38 millimeters; a size 16 mesh may have an average sieve diameter of about 1.19 millimeters; a size 20 mesh may have an average sieve diameter of about 0.84 millimeters; and a size 50 mesh may have an average sieve diameter of about 0.30 millimeters accordingly. In yet certain other instances, the number of porous particles having at least one of the size ranges: 20 to 50 weight percent of the number of porous particles retainable by a size 8 mesh, 40 to 60 weight percent of the number of porous particles retainable by a size 16 mesh, and 1 to 20 weight percent of the number of porous particles retainable by a size 20 mesh. In yet certain other instances, the number of porous particles have at least one of the following size ranges: 30 to 40 weight percent of the number of porous particles retainable by a size 8 mesh, 45 to 55 weight percent of the number of porous particles retainable by a size 16 mesh, and 5 to 15 weight percent of the number of porous particles retainable by a size 20 mesh.

A non-limiting particle distribution profile of the porous material may include 6.9 to 7.3 weight percent of porous particles retained by a size 8 mesh, 77.3 to 78.3 weight percent of porous particles retainable by a size 16 mesh, 12.8 to 13.4 weight percent of porous particles retainable by a size 20 mesh, 1.6 to 2.2 weight percent of porous particles retainable by a size 50 mesh, and about 0.1-0.3 weight percent of porous particles retainable by a pan mesh, the sum of the percentages being about 100 weight percent. A yet non-limiting particle distribution profile of the porous material may include 31.0 to 41 weight percent of porous particles retainable by a size 8 mesh, 45 to 55 weight percent of porous particles retainable by a size 16 mesh, 7.0 to 13.0 weight percent of porous particles retainable by a size 20 mesh, 1.6 to 2.2 weight percent of porous particles retainable by a size 50 mesh, and about 0.1-0.3 weight percent of porous particles retainable by a pan mesh, the sum of the percentages being about 100 weight percent.

A non-limiting particle distribution profile of the porous material may include any combination of the following ranges, provided the total profile sums to 100 percent: 20 to 50 weight percent of the porous ceramic particles retainable by a size 18 mesh sieve, 30 to 60 weight percent of the porous particles retainable by a size 35 mesh sieve, 10 to 40 weight percent of the porous particles retainable by a size 60 mesh sieve, 10 to 30 weight percent of the porous particles retainable by a size 10 mesh sieve, 50 to 90 weight percent of the porous particles retainable by a size 18 mesh sieve, 1 to 10 weight percent of the porous particles retainable by a size 35 mesh sieve, 1 to 10 weight percent of the porous particles retainable by a size 18 mesh sieve, 30 to 80 weight percent of the porous particles retainable by a size 35 mesh sieve, and 30 to 60 weight percent of the porous particles retainable by a size 60 mesh sieve, 5 to 15 weight percent of the porous particles retainable by a size 18 mesh sieve, 15 to 60 weight percent of the porous particles retainable by a size 35 mesh sieve, and 10 to 40 weight percent of the porous particles retainable by a size 60 mesh sieve.

In one or more embodiments, the porous particles may be of any suitable shape. Dependent upon particular water absorption and kinetic absorption needs, the porous particles may be designed and constructed in one or more shapes including gravel, granules, grains, flakes, rods, powders, cylinders, pyramids, cubes, and combinations thereof, and in various dimensions thereof.

The porous particles may have an average surface area of greater than 250 square meters per gram of dry weight. In one embodiment, the porous particles have an average surface area range of 250 to 10,000 square meters per gram of dry weight. In another embodiment, the porous particles have an average surface area about 1,000 square meters per gram of dry weight.

There are several parameters used as a measure of porosity including: specific surface area, specific pore volume or porosity, and pore size and its distribution.

Specific Surface Area, $m^2/g$=[(Total surface area, $m^2$)/(Mass of the solid, g)]

Porosity, %=[Volume of pores/Volume of solid (including pores)]×100

Specific Pore volume, $cm^3/g$=[(Total pore volume, $cm^3$)/(Mass of the solid, g)]

Open pores may be accessible, whereas closed pores may be inaccessible pores. Open pores can be inter-connected, passing, or dead-end. Pores may be of many shapes, including cylindrical, conical, spherical or ink bottle, slits, interstices, and the combinations thereof. Techniques of measuring pore size, volume, shape, distribution, and the like are well known in the art. The following disclosures are hereby incorporated in their entirety by reference herein. S. Brunauer, P. Emmett, E. Teller Adsorption of Gases in Multimolecular Layers, J. Am. Chem. Soc., 1938, 60 (2), pp 309-319; I. Langmuir The Constitution and Fundamental Properties of Solids and Liquids. Part I. Solids. J. Am. Chem. Soc., 1916, 38 (11), 2221-2295; S. Lowell & J. E. Shields, Powder Surface Area and Porosity, 3rd Ed.; Chapman & Hall, New York, 1991; F. Rouquerol, J. Rouquerol, K. S. W. Sing, Adsorption by Powders and Porous Solids, Academic Press, 1-25, 1999; Sing, K. S. W. et al. Reporting Physisorption Data for Gas/Solid Systems. Pure & Appl. Chem. 57, 603-619 (1985); Brunauer-Emmett-Teller (BET) Surface Area Determination, BS 4359-1:1996 (ISO 9277:1); and, F. Rouquerol, J. Rouquerol, K. S. W. Sing, Adsorption by Powders and Porous Solids, Academic Press, 1-25, 1999.

In at least one embodiment, the porous particles may have a total porosity of about 50 to about 90%. For example, the total porosity may be from about 50 to about 85%, about 60 to about 80% about, or about 70 to about 85%. The porous particles may have a total capillary porosity of about 30 to about 50%, for example, about 37 to about 45%. The porous particles may have a total non-capillary porosity of about 25 to about 50%, for example, about 30 to about 40%. In one embodiment, the porous particles may have a total capillary porosity and a total non-capillary porosity in a ratio ranging from about 0.7 to about 1.3. In another embodiment, the ratio of total capillary porosity to capillary porosity is about 1:1. In additional embodiments, the ratio of total capillary porosity to capillary porosity may be about 0.9:1.1, about 0.8:1.2, about 0.7:1.3, about 1.3:0.7, about 0.8:1.2, or about 0.9:1.1.

The average pore size of the porous particles can be any suitable value. The average pore size may range from about 0.1 to about 20 microns. For example, the average pore size may range from about 0.5 to about 18 microns, about 1.0 to about 16 microns, about 2.0 to about 14 microns, about 2.5 to about 12 microns, about 3.0 to about 10 microns, about 3.5 to about 8 microns, about 0.5 to about 2.5 microns, about 2.5 to about 5.0 microns, about 5.0 to about 7.5 microns, about 7.5 to about 10.0 microns, about 10.0 to about 12.5 microns, about 12.5 to about 15.0 microns, about 15.0 to about 17.5 microns, or about 17.5 to about 20.0 microns in diameter.

In another embodiment, the porous particles 22 may be coated with a polymer. The polymer coating 34 may improve or maximize temperature regulation and kinetic energy absorption of the particles 22. The porous particles 22 may have the ability to hold nearly their weight in water, or greater than their weight. As a result, when radiant energy (e.g., from the sun) increases on the field, the water reservoir held within the porous particles 22 will begin to evaporate, thereby cooling the surface of the field. In embodiments where a polymer coats at least a portion of the porous particle, the cooling effect on the surface of the field may be prolonged. Without being limited to any theory, it is believed a partially polymer-coated porous particle will entrap water within the pores. Radiant heat will cause the water within the pores to evaporate which causes a cooling effect on the sports field. The polymer coating 34 may close or partially close off some of the pore cavities, thereby prolonging the release of the water. In addition to providing prolonged cooling, the polymer coating 34 may also reduce the wear or breakdown of the porous particles 22.

With reference to FIG. 3, an image showing various amounts of polymer coverage on porous particles 22 is shown. The polymer coating 34 may be applied to the porous particles 22 using any suitable technique, and such techniques are well known in the art. In one embodiment, the polymer may be atomized and sprayed onto the particles 22, for example, as they are moving or falling. The coating 34 may be uniformly applied to the particles 22, such that each particle has the same, or substantially the same, level of coating (e.g., the same or similar percentage of outer surface coated). The coating 34 may also be applied such that there is variation in the level of coating. The polymer may be dyed in order to show the amount of polymer coating 34 applied. The level or amount of coating may vary according to the polymer thickness: darker green as the polymer thickness increases; and light green as the polymer thickness is thinner. In the example shown in FIG. 3, the coating 34 is shown by shading. The coating process may result in a portion of the porous particles 22 not receiving any coating, while another portion receives a partial or full polymer coating 34.

The polymer coating may include any polymer that can coat and block at least some of the pores in the porous particles. The polymer may be selected from a group consisting of acrylic resin, Low Density Polyethylene (LDPE), High Density Polyethylene (HDPE), Polypropylene (PP), Polyvinyl Chloride (PVC), Polystyrene (PS), Nylon, nylon 6, nylon 6,6, Teflon (Polytetrafluoroethylene), Thermoplastic polyurethanes (TPU), acrylate monomers, Methacrylates, Methyl acrylate, Ethyl acrylate, 2-Chloroethyl vinyl ether, 2-Ethylhexyl acrylate, Hydroxyethyl methacrylate, Butyl acrylate, Butyl methacrylate, TMPTA, Polymethyl acrylate, polymethyl methacrylate, Acrylic rubber known by the chemical name alkyl acrylate copolymer (ACM), polyolefin homo- and copolymers; styrene copolymers and terpolymers; ionomers; ethyl vinyl acetate homo- and copolymers; polyvinylbutyrate homo- and copolymers; polyvinyl chloride homo- and copolymers; metallocene polyolefins; poly (alpha olefins) homo- and copolymers; ethylene-propylene-diene terpolymers; fluorocarbon elastomers; polyester polymers and copolymers; polyamide polymers and copolymers, polyurethane polymers and copolymers; polycarbonate polymers and copolymers; polyketones; and polyureas; and blends thereof. Exemplary resins also include those selected from the group consisting of epoxy resins, acrylated urethane resins, acrylated epoxy resins, ethylenically unsaturated resins, aminoplast resins, isocyanurate resins, phenolic resins, vinyl ester resins, vinyl ether resins, urethane resins, cashew nut shell resins, napthalinic phenolic resins, epoxy modified phenolic resins, silicone resins, polyimide resins, urea formaldehyde resins, methylene dianiline resins, methylpyrrolidinone resins, acrylate and methacrylate resins, isocyanate resins, unsaturated polyester resins, and blends thereof.

Acrylic resins feature excellent transparency and durability. Acrylic resins may be made by polymerizing acrylic acid or methacrylic acid or a derivative, as known in the art. Acrylate monomers used to form acrylate polymers are based on the structure of acrylic acid, which consists of a vinyl group and a carboxylic acid terminus. Other typical acrylate monomers are derivatives of acrylic acid, such as methyl methacrylate in which one vinyl hydrogen and the carboxylic acid hydrogen are both replaced by methyl groups, and acrylonitrile in which the carboxylic acid group is replaced by the related nitrile group.

The polymer may be coated onto the porous particle at a thickness of 1.0 µm to 0.50 mm. In one embodiment, the polymer is coated at a thickness of 1-100 µm. In another embodiment, the polymer is coated at a thickness of 5-50 µm. The polymer may be primarily coated onto the porous particles' exterior surface; however, polymer coating within the pores may also be advantageous in certain instances. The polymer coverage of the exterior surface of the porous particles may be from 0% to 75%, or any sub-range therein. For example, the polymer may cover from 0.1 to 75%, 1 to 50%, 5 to 50%, 10 to 50%, or 15 to 40%. It has been found that when the pores of the porous particles are uncovered, water enters the particles at a faster rate. Without being limited to any particular theory, it is believed that porous particles with a range in the level of polymer coating of their exterior surfaces will result in a dynamic range of water evaporation from the particles. That is, porous particles with little to no polymer coating will evaporate water more quickly, resulting in a faster cooling effect to the field surface, while porous particles having a higher exterior surface coated with the polymer will retain the water entrapped in the pores longer in response to radiant heat.

In one or more embodiments, the infill material 16 may to hold 7 to 9 times more water than some conventional sand infill compositions. The pore spaces in the porous particles can hold and absorb water from irrigation or rain and slowly release the water as the porous material dries out. This reservoir of water will help lengthen the effect of evaporative cooling of the field. In this regard, the porous particles may be provided with a desirable level of porosity to effectively function as a moisture retention material. In one embodiment, the porous particles may hold approximately 1:1 weight ratio of water (e.g., the particle may retain an amount of water equal to its weight). In other embodiments, the porous particles may hold approximately 1:0.5, 0.5:1, 0.5:1.5, 1.5:0.5, 0.7:1, 1:0.7, 0.7:1.3 or 1.3:0.7 weight ratio of water. In another embodiment, the porous particles may hold approximately 1:1±50% weight ratio of water (e.g., 1:0.5 to 1:1.5).

Without being held to any particular theory, it is believed that porous particles that are at least partially covered require the evaporative moisture to take a more circuitous route out of the porous particle, compared to an uncoated particle. The pores may be fully covered by the polymer or partially covered. That is, the polymer coating may cover a portion of the pores or all of the pores may be covered by the polymer. In one embodiment, the pores may be 0 to 100% covered. In another embodiment, the pores may be 0.1 to 90% covered. In another embodiment, the pores may be 5 to 75% covered. Expressed in a different way, the polymer may coat 0 to 100% of the porous particles' outer surface area, such as 0.1 to 90% or 5 to 75% of the outer surface area. In one embodiment, the polymer coats an average of 15 to 50% of the porous particles' outer surface area. In another embodiment, the polymer coats an average of 20 to 40% of the porous particles' outer surface area. In another embodiment, the polymer coats an average of 25 to 35% of the porous particles' outer surface area. In another embodiment, the polymer coats an average or 25% or 35% of the porous particles' outer surface area.

Current artificial turf systems have synthetic turf fibers with a length of about 1.5 inches and an infill material with a depth of over 1 inch. Since the infill material in current systems provides a cushioning function in addition to supporting/straightening the fibers, it must be deep enough to absorb significant amounts of energy applied to the field surface. The depth of the disclosed porous particles as an infill material 16 within the synthetic turf fibers 12 may be in a range between 0.2 to 2 inches. Without being limited to any theory, a depth of less than 0.75 inches of porous particles may serve a balance of temperature regulation, potential kinetic energy absorption, and natural surface feel. A shallow depth allows for the use of shorter filament fibers 12 and less grooming of the field will be required since the short blades will stand up vertical. A shallow depth of less than 0.75 inches helps eliminate high and low spots from migrating which creates a consistent surface for the athletes. A reduced depth also requires less infill material 16, which lowers the cost of the infill. Furthermore, shorter synthetic turf fibers will help reduce heat buildup on the field surface.

The depth of the infill material 16 may be reduced at least in part because of the addition of the sub-layer 18 to the system 10. The sub-layer 18 may provide a cushioning or elastic/resilient property to the turf system 10, which may reduce or eliminate the need in current systems for the infill material to provide that function. By reducing or eliminating the energy absorption requirements of the infill material 16, its depth and/or amount may be reduced. As a result, the length of the synthetic turf fibers 12 may also be reduced, while still maintaining the same or a similar length of the fiber that is above the infill material 16. In one embodiment, the length of the synthetic turf fibers 12 may be reduced to 1.25 inches, or less. For example, the fibers 12 may have a length of an inch or less, such as 0.5" to 1.0" or 0.75" to 1.0". This reduction in fiber length compared to current/conventional turf systems may reduce the amount of material needed and the cost of the fibers. As described above, it may also reduce the amount of heat that is trapped or radiates and builds up on the field surface.

The infill material 16 may be free or substantially free of any sand materials, such as very coarse sand, coarse sand, medium sand, fine sand, or very fine sand. These sand sizes may be defined as shown in Table 3, below. The infill may also be free or substantially free of any rubber material, such as crumb rubber. The term "substantially free" may be defined as less than 1.0 weight percent. In other embodiments, the infill material 16 may contain less than 5, 2.5, or 1.0 weight percent of sand and/or rubber. In one embodiment, no sand or rubber is intentionally added to the infill and any presence of the sand materials would be incidental (e.g., blown in from wind or tracked onto the field from shoes). In other embodiments, the infill material 16 may include some sand and/or crumb rubber, for example, up to 20% crumb rubber and/or sand.

TABLE 3

| Avg. Size (mm) | Avg. Size (in) | Sand Size |
|---|---|---|
| 1-2 mm | 0.039-0.079 in | Very coarse sand |
| ½-1 mm | 0.020-0.039 in | Coarse sand |
| ¼-½ mm | 0.010-0.020 in | Medium sand |
| 125-250 µm | 0.0049-0.010 in | Fine sand |
| 62.5-125 µm | 0.0025-0.0049 in | Very fine sand |

Figure 4:
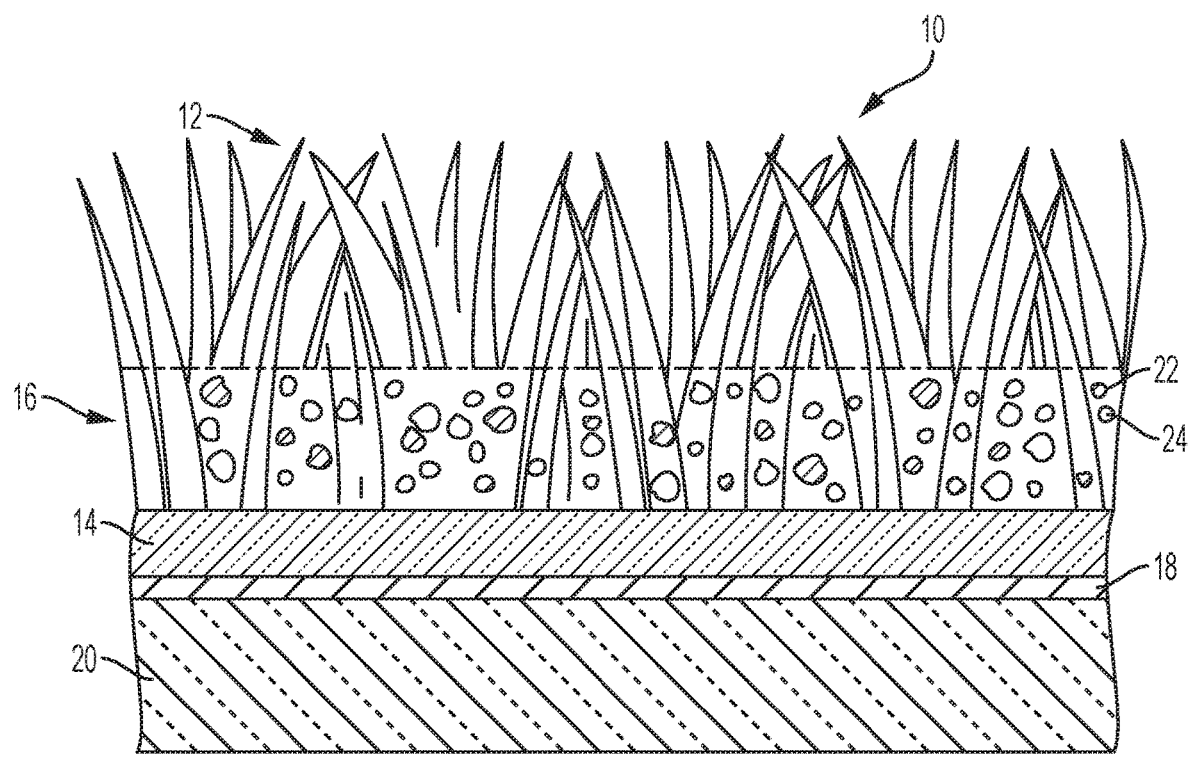
FIG. 4 is a schematic cross-section of an artificial turf system with an infill material including cork, according to an embodiment.

In one embodiment, shown in FIG. 4, the infill material 16 may include porous particles 22, such as the porous ceramic and/or inorganic non-ceramic particles described above, as well as cork 24. The cork 24 may comprise from 5 to 95 wt. % of the infill material 16, with the porous ceramic particles providing the balance. For example, cork may comprise up to 10, 25, 50, or 75 wt. %. of the infill material 16. In one embodiment, cork may comprise from 5 to 75 wt. %. of the infill material 16. In another embodiment, cork may comprise from 5 to 50 wt. %. of the infill material 16. In another embodiment, cork may comprise from 5 to 25 wt. %. of the infill material 16. The cork 24 may be in any suitable form, such as granules, particles, chips, or others. The cork particles may have an average size similar to fine, medium, coarse, or very coarse sand, such as the sizes in Table 3. In another embodiment, the cork may have any of the size ranges described above for the porous particles, for example "10×20" or "24×48". In another embodiment, the cork may have a size such that 95% of the particles are less than 2 mm and 95% are larger than 0.297 mm. In another embodiment, the cork particles may have an average particle size from 0.5 to 1.0 mm. The addition of cork to the infill material 16 may provide the infill material and the playing surface with a softer feel and may make the system 10 more comfortable to fall, slide, or land on and may also have a cooling effect on the field.

Commonly used infill materials are granulated crumb rubber (usually from used tires), flexible plastic pellets, sand, and rubber-coated sand. A combination of sand and crumb rubber is often used. Crumb rubber is produced by grinding used tires. Steel and fiber tire components are removed during the process and the rubber pellets are sorted by size. Generally, pellet sizes ranging from about one-sixteenth to one-quarter inch in diameter are used on synthetic turf. In another instance, crumb rubber is typically applied at a rate of two to three pounds per square foot of field surface. Optionally, the rubber may be coated. Coated Rubber: Both ambient and cryogenic rubber can be coated with colorants, sealers, or anti-microbial substances if desired. Coated rubber provides additional aesthetic appeal, reduction of dust by products during the manufacturing process and complete encapsulation of the rubber particle.

As described above, the infill material 16 of the system 10 may include little or no sand and/or rubber. Reduction or elimination of these materials may have several advantages, such as a reduction in particle migration. In conventional sand infill compositions, the sand tends to separate from the rubber and migrate down through the rubber and settle to the bottom. Separation and migration of sand often observed with the conventional infill compositions causes unwanted layering of the infill and packing of the sand. The packing may cause the turf field to become hard and lose its requisite resilience. Removal and replacement of the compacted sand is a difficult, time-consuming and expensive process, because the compacted sand layer becomes closely packed together with the artificial upstanding strands and is difficult to remove. Therefore, once packing has occurred in the conventional rubber and sand infill compositions, to reduce or reverse the packing via remixing is nearly impossible without having to disturb or sometimes destroy the integrity of the artificial turf field as a whole.

In addition to the maintenance benefits described above, elimination or reduction of the crumb rubber in the infill material 16 may also have health and safety benefits. As described above, the crumb rubber infill material has been labeled as a possible carcinogen. This has caused some groups, organizations, municipalities, etc. to ban the use of crumb rubber turf systems. The disclosed infill material 16 provides a safer alternative to the crumb rubber. Current crumb rubber-based systems have also been linked to potential lower-body injury problems, described previously. The disclosed infill material 16 may address those issues by allowing for a lower depth of infill material in the turf system 10 and thereby reducing the contact time the foot is "anchored" in the turf when running or cutting. Furthermore, the reduction or elimination of crumb rubber may reduce the temperature of the turf system 10, at least in part due to the trapping and releasing of water, described above.

In one or more embodiments, the present invention is advantageous in providing an infill material 16 that, when applied, has less in wear relative to existing infill compositions based on sand and/or crumb rubber. In certain instances, Applicants' infill has 5 to 85 percent reduction in wear, compared to current infill materials. For example, the infill material 16 may have a 15 to 75, 25 to 65, or 35 to 55 percent reduction in wear. Wear may be defined or described by ASTM F1015-03. Without being held to any particular theory, it is believed that in conventional turf systems, sand particles having sharp edges can shred the synthetic fibers. In contrast, the porous particles (e.g., porous ceramic particles) in the disclosed infill material 16 may have a sub rounded shape that is less sharp and will have less of a shredding effect on the strands 12.

In at least one embodiment, a sub-layer 18 is provided in the system 10, and may be beneath the strands 12, backing 14, and infill material 16 and positioned on a support surface 20. The entire artificial turf system 10 can be laid down on a support surface 20, which can be formed of crushed stone bases, concrete, soil, gravel, stone, asphalt, smoothed sand, compacted soil, fiber reinforced soil, glass, ceramics, and combinations thereof. The sub-layer 18 may be designed to absorb kinetic energy and/or assist in water drainage. In embodiments where the infill material 16 has little or no crumb rubber and/or where the infill material 16 has a reduced depth (e.g., 0.75" or less), the sub-layer 18 may compensate for a reduction in energy absorption due to less crumb rubber.

The sub-layer 18 may be formed of an elastic or resilient material (e.g., a material that recoils or returns to its original shape after being deformed, such as compressed). In certain instances, the sub-layer 18 may be composed of or include rubber, however, any material that provides the described resilient/elastic and force reduction properties may be used. For example, other suitable materials may include foams, cork, or playable plastics. The sub-layer 18 may have a thickness of 0.01 inches to 8 inches, such as 0.1 to 6 inches, 0.1 to 4 inches, 0.25 to 2 inches, 0.5 to 2 inches, or 0.5 inches to 1 inch. The sub-layer 18 may have a density range of 0.2 to 0.9 g/cm³, such as 0.3 to 0.8 g/cm³, 0.4 to 0.6 g/cm³, or 0.4 to 0.5 g/cm³. The sub-layer 18 may have a force reduction of 20 to 80%, or any sub-range therein. For example, the force reduction may be 30 to 70% or 35 to 50%. Force reduction may be measured according to ASTM F2569-11, Standard Test Method for Evaluating the Force Reduction Properties of Surfaces for Athletic Use, the disclosure of which is hereby incorporated in its entirety by reference herein.

Figure 5:
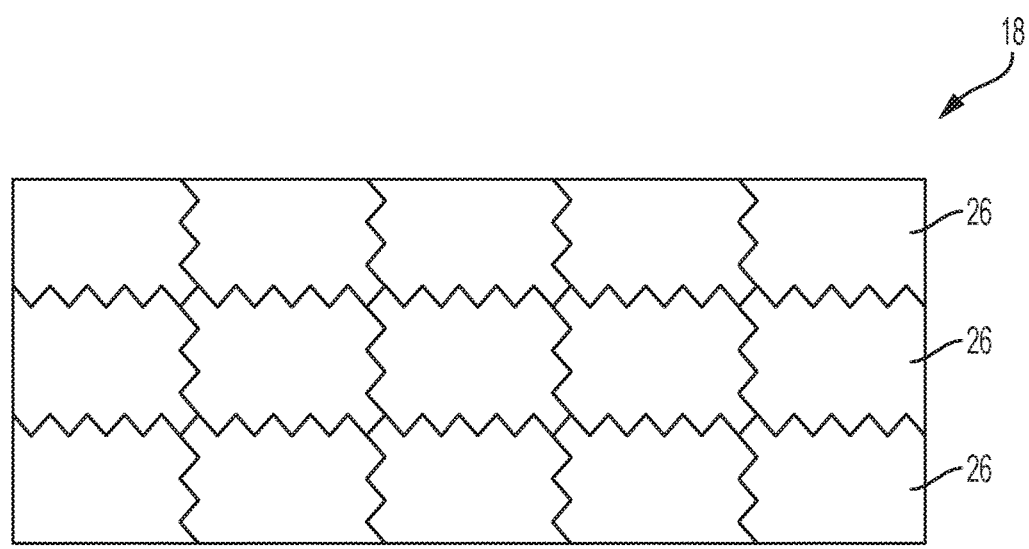
FIG. 5 is a schematic top plan view of a sub-layer of an artificial turf system including a plurality of panels, according to an embodiment.

The sub-layer 18 may have any suitable form, such as a continuous sheet or a plurality of connected pieces. In one embodiment, the sub-layer 18 may be in the form of panels 26, an example of which is shown in FIG. 5. The plurality of panels 26 may have seams for ease of installation, removal, and/or replacement. The panels may be designed to interlock with each other (e.g., like puzzle pieces). In another embodiment, the sub-layer 18 may be sprayed on the support surface 20. To assist in water drainage, in one embodiment the sub-layer 18 may be water permeable to drain water to the support layer below. The sub-layer 18 may have a permeability of 25 to 5000 permeability coefficient at 25° C. (P×$10^{10}$). Where the permeability coefficient (P)= (amount of permeate) (thickness of rubber)/(surface area) (time) (pressure-drop across the rubber). Units of P: [$cm^3$ cm]/[$cm^2$s (cm Hg)].

Figure 6:
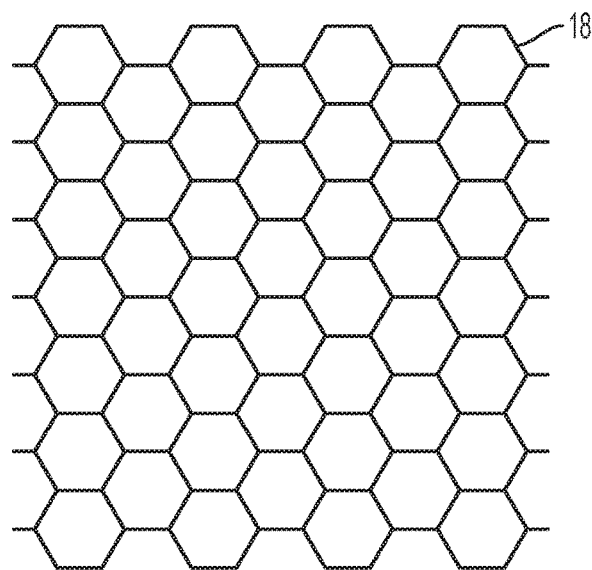
FIG. 6 is a schematic top plan view of an open-cell sub-layer of an artificial turf system, according to an embodiment.

In at least one embodiment, the sub-layer 18 may be water permeable. To provide the sub-layer 18 with water permeability, it may be formed of a porous material. Alternatively, the sub-layer 18 may be perforated or have gaps or openings therein to allow water to pass through. In one embodiment, the sub-layer 18 may have a macroscopic open-cell structure. The open-cell structure may be formed of a repeating pattern of a solid material with openings therein, for example, a honeycomb structure, as shown in FIG. 6. Any type of pattern or style of structure may be divided into panels 26, as described above. For example, the honeycomb structure shown in FIG. 6 may be a single panel that is repeated to form the sub-layer 18. In addition to, or in place of, the above, drain tile panels, French drains, and the like may be employed to remove water from the support surface. The structure of the sub-layer 18 may be configured to provide cushioning or force reduction (e.g., 35 to 50%), while also returning 100% (or near 100%) to its original shape. The sub-layer shape or structure may be tailored to the playing surface. For example, a sub-layer 18 for a baseball infield may be stiffer than a sub-layer for a baseball outfield or for a football or soccer field.

Figure 7:
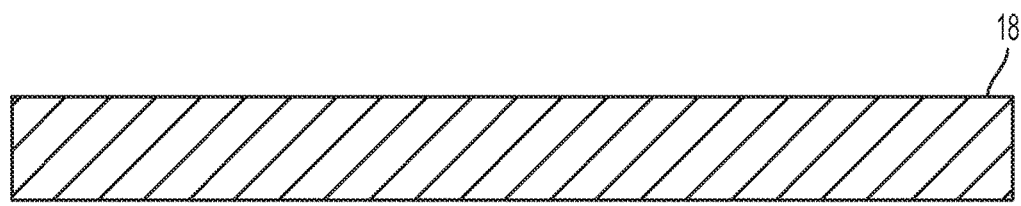
FIG. 7 is a schematic cross-section of a solid sub-layer of an artificial turf system, according to an embodiment.
Figure 8:
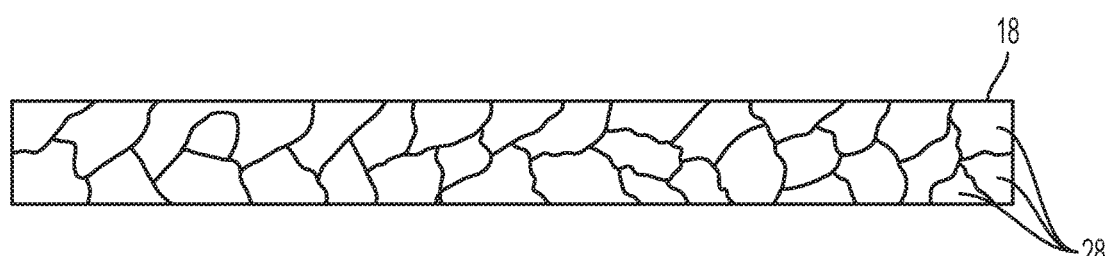
FIG. 8 is a schematic cross-section of a sub-layer of an artificial turf system including a plurality of fused granules, according to an embodiment.
Figure 9:
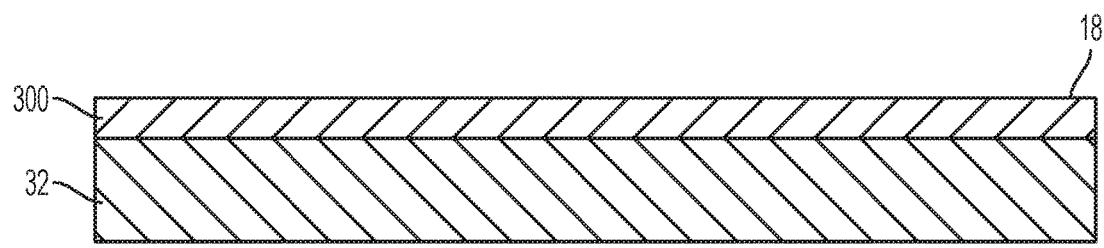
FIG. 9 is a schematic cross-section of a multi-layer sub-layer of an artificial turf system, according to an embodiment.

With reference to FIGS. 7-9, the sub-layer 18 may be formed of a continuous solid material or a plurality of fused or held-together smaller components. For example, the sub-layer 18 may include a solid sheet of rubber (as shown in FIG. 7), which may be perforated or cut to provide openings. The sub-layer 18 may also include a plurality of rubber particles or granules 28 that are held together by a binder or adhesive, as shown in FIG. 8. The binder or adhesive may be a polymer, such as polyurethane. The sub-layer 18 may include multiple layers of material, for example in a stacked or laminated pattern. The solid or granulated rubber layers described above may have a layer of a different material on top of, below, or between layers of the rubber material. In one embodiment, a polymeric layer may be provided on top of, below, or between layers of the rubber material, such as a polyurethane or mix of polyurethane and EPDM. FIG. 9 shows an example in which a polymer layer 300 is provided over a layer of rubber material 32. Examples of suitable materials for sub-layer 18 may include the BSS track system materials from Beynon®, such as the BSS 100, BSS 200, BSS 300, BSS 1000, or BSS 2000. The BSS 100, for example, includes a layer of rubber granules held together by a polyurethane binder and a top layer of sprayed-on polyurethane and EPDM granules.

In certain instances, the deformation of the rubber due to a weight load may be considered. Creep is the deformation of a rubber material under constant load. Typically, creep increases as temperature rises. Rubbers that are firm and have greater thermal stability tend to exhibit lower creep values at higher temperatures. For example, silicone rubber exhibits less creep than organic rubbers. The sub-layer 18 may have a creep % that is less than 80% (creep % at 100° C. after 100 hours), for example, less than 40% or less than 15%. The sub-layer 18 may be configured to be resistant to extreme environments and temperatures from −55° C. to +300° C. while still maintaining its useful properties.

The strands 12, infill material 16, backing 14, and sub-layer 18 may be placed or positioned over a support surface 20. The support surface 20 may be formed of crushed stone bases, concrete, soil, gravel, stone, asphalt, smoothed sand, compacted soil, fiber reinforced soil, glass, ceramics, or combinations thereof.

While the best mode for carrying out the invention has been described in detail, those familiar with the art to which this invention relates will recognize various alternative designs and embodiments for practicing the invention as defined by the following claims. While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An artificial turf field system, comprising:
a plurality of synthetic turf strands attached to a backing layer;
an infill material positioned between the synthetic turf stands, the infill material including a plurality of porous particles, wherein at least a portion of the porous particles are at least partially covered in a polymer coating, and wherein the porous particles have varying amounts of their outer surfaces covered by the coating, such that the porous particles are configured to have a dynamic range of water evaporation time when the pores of the porous particles are filled with water;
a sub-layer beneath the backing layer, the sub-layer formed of a resilient material; and
a support layer beneath the sub-layer.

2. The system of claim 1, wherein the plurality of porous particles have a porosity of no less than 30 volume percent.

3. The system of claim 1, wherein the plurality of porous particles hold water in a ratio of particle weight to water weight of 1:0.5 to 1:1.5.

4. The system of claim 1, wherein the porous particles include porous ceramic particles.

5. The system of claim 1, wherein the infill material is substantially free of crumb rubber and sand.

6. The system of claim 2, wherein the polymer coating includes one of acrylic resin, Low Density Polyethylene (LDPE), High Density Polyethylene (HDPE), Polypropylene (PP), Polyvinyl Chloride (PVC), Polystyrene (PS), Nylon, Polytetrafluoroethylene (PTFE), Thermoplastic polyurethanes (TPU), acrylate monomers, Methacrylates, Methyl acrylate, Ethyl acrylate, 2-Chloroethyl vinyl ether, 2-Ethylhexyl acrylate, Hydroxyethyl methacrylate, Butyl acrylate, Butyl methacrylate, trimethylolpropane triacrylate (TMPTA), Polymethyl acrylate, polymethyl methacrylate, alkyl acrylate copolymer (ACM) and combinations thereof.

7. The system of claim 1, wherein the infill material has a depth of less than 0.75 inches.

8. The system of claim 1, wherein the plurality of porous particles has an average pore size of 0.5 to 18 microns.

9. The system of claim 1, wherein the sub-layer includes rubber.

10. The system of claim 1, wherein the sub-layer has a thickness of 0.01 to 8 inches.

11. The system of claim 1 wherein the support layer includes crushed stone, concrete, soil, gravel, stone, asphalt, smoothed sand, compacted soil, fiber reinforced soil, glass, ceramics, or combinations thereof.

12. The system of claim 1, wherein the infill material includes cork particles.

13. An artificial turf field system, comprising:
   a plurality of synthetic turf strands attached to a backing layer; and
   an infill material positioned between the synthetic turf stands, the infill material including a plurality of porous particles, wherein at least a portion of the porous particles are at least partially covered in a polymer coating, wherein the porous particles have varying amounts of their outer surfaces covered by the coating, such that the porous particles are configured to have a dynamic range of water evaporation time when the pores of the porous particles are filled with water.

14. The system of claim 13, and the plurality of porous particles hold water in a ratio of particle weight to water weight of 1:0.5 to 1:1.5.

15. The system of claim 13, further comprising a sub-layer beneath the backing layer, the sub-layer formed of a resilient material, and wherein the sub-layer includes rubber and has a thickness of 0.01 to 8 inches and the porous particles have a porosity of no less than 30 volume percent.

* * * * *